(12) United States Patent
Nambu et al.

(10) Patent No.: US 10,641,165 B2
(45) Date of Patent: May 5, 2020

(54) TURBOCHARGER

(71) Applicant: MITSUBISHI HEAVY INDUSTRIES ENGINE & TURBOCHARGER, LTD., Sagamihara-shi, Kanagawa (JP)

(72) Inventors: Takashi Nambu, Tokyo (JP); Naomichi Shibata, Tokyo (JP); Shuichi Isayama, Tokyo (JP); Takaya Futae, Tokyo (JP); Yuya Kojima, Tokyo (JP)

(73) Assignee: MITSUBISHI HEAVY INDUSTRIES ENGINE & TURBOCHARGER, LTD., Sagamihara-Shi (JP)

( * ) Notice: Subject to any disclaimer, the term of this patent is extended or adjusted under 35 U.S.C. 154(b) by 0 days.

(21) Appl. No.: 16/064,102

(22) PCT Filed: Dec. 25, 2015

(86) PCT No.: PCT/JP2015/086256
§ 371 (c)(1),
(2) Date: Jun. 20, 2018

(87) PCT Pub. No.: WO2017/109943
PCT Pub. Date: Jun. 29, 2017

(65) Prior Publication Data
US 2018/0371985 A1    Dec. 27, 2018

(51) Int. Cl.
*F02B 39/14* (2006.01)
*F01M 9/10* (2006.01)
(Continued)

(52) U.S. Cl.
CPC ............ *F02B 39/14* (2013.01); *F01D 25/162* (2013.01); *F01D 25/18* (2013.01); *F01D 25/20* (2013.01);
(Continued)

(58) Field of Classification Search
CPC ........ F02B 39/14; F02C 6/12; F05D 2220/40; F01M 9/10; F01M 11/02; F01M 2011/021
(Continued)

(56) References Cited

U.S. PATENT DOCUMENTS

| 2015/0184693 A1 | 7/2015 | Lueddecke |
| 2017/0234213 A1 | 8/2017 | Futae et al. |

(Continued)

FOREIGN PATENT DOCUMENTS

| CN | 28640944 Y | 1/2007 |
| CN | 106715936 A | 5/2017 |

(Continued)

OTHER PUBLICATIONS

International Search Report (Form PCT/ISA/210) for International Application No. PCT/JP2015/086256, dated Mar. 29, 2016, with English translation.

(Continued)

*Primary Examiner* — Mark A Laurenzi
*Assistant Examiner* — Mickey H France
(74) *Attorney, Agent, or Firm* — Birch, Stewart, Kolasch & Birch, LLP

(57) ABSTRACT

This turbocharger includes a rotating shaft extending along an axis, a turbine wheel provided at a first end portion of the rotating shaft, a compressor wheel provided at a second end portion of the rotating shaft, a housing accommodating at least a portion of the rotating shaft, bearings provided in the housing and configured to support the rotating shaft, supply flow paths supplying lubricating oil to the bearings, a discharge oil chamber formed in the housing and to which the lubricating oil is discharged from the bearings, and an oil drainage port formed below the discharge oil chamber, in which at least one of the discharge oil chamber and the oil drainage port is formed to be asymmetric between a first (Continued)

region and a second region defined by a vertical plane including the axis of the rotating shaft as a boundary plane.

12 Claims, 11 Drawing Sheets

(51) Int. Cl.
  *F02C 6/12* (2006.01)
  *F01D 25/18* (2006.01)
  *F02C 7/06* (2006.01)
  *F01D 25/20* (2006.01)
  *F01D 25/16* (2006.01)
  *F01D 25/24* (2006.01)
  *F01M 11/02* (2006.01)

(52) U.S. Cl.
  CPC ............ *F01D 25/243* (2013.01); *F01M 9/10* (2013.01); *F01M 11/02* (2013.01); *F02C 6/12* (2013.01); *F02C 7/06* (2013.01); *F01M 2011/021* (2013.01); *F05D 2220/40* (2013.01); *F05D 2260/602* (2013.01); *F05D 2260/609* (2013.01)

(58) Field of Classification Search
  USPC .......... 60/597, 598, 605.1, 605.3; 123/559.1
  See application file for complete search history.

(56) References Cited

U.S. PATENT DOCUMENTS

| 2017/0276233 A1 | 9/2017 | Nishioka et al. |
| 2018/0156268 A1* | 6/2018 | Bunno .................... F02B 39/14 |
| 2018/0156269 A1* | 6/2018 | Bunno .................. F01D 25/166 |

FOREIGN PATENT DOCUMENTS

| CN | 106795808 A | 5/2017 |
| EP | 3 196 437 A1 | 7/2017 |
| JP | 7-208191 A | 8/1995 |
| JP | 2006-29148 A | 2/2006 |
| JP | 2008-111502 A | 5/2008 |
| JP | 2009-270612 A | 11/2009 |
| JP | 2011-111900 A | 6/2011 |
| JP | 2013-217436 A | 10/2013 |
| JP | 2015-530537 A | 10/2015 |
| JP | 2015-209788 A | 11/2015 |
| WO | WO 2014/044363 A1 | 3/2014 |
| WO | WO 2014/132886 A1 | 9/2014 |
| WO | WO 2016/079781 A1 | 5/2016 |

OTHER PUBLICATIONS

Written Opinion of the International Searching Authority (Form PCT/ISA/237) for International Application No. PCT/JP2015/086256, dated Mar. 29, 2016, with English translation.

* cited by examiner

TURBOCHARGER

TECHNICAL FIELD

The present invention relates to a turbocharger.

BACKGROUND ART

A rotating shaft of a turbocharger is supported by bearings. Such a turbocharger includes a housing having a cylindrical accommodating portion for accommodating the bearings. By fitting the bearings into the accommodating portion of the housing, the bearings are supported by the housing. A plurality of such bearings are provided at intervals in an axial direction of a rotating shaft. The rotating shaft of the turbocharger is inserted through the plurality of bearings. Thereby, the rotating shaft is capable of rotating relative to the housing.

In such a turbocharger, lubricating oil is supplied to the bearings in order to inhibit frictional resistance in the bearings.

Patent Document 1 and 2 disclose a configuration having an oil supply hole for supplying lubricating oil to bearings of a turbocharger.

CITATION LIST

Patent Literature

Patent Document 1: Japanese Unexamined Patent Application, First Publication No. 2009-270612

Patent Document 2: Japanese Unexamined Patent Application, First Publication No. 2013-217436

SUMMARY OF INVENTION

Technical Problem

Lubricating oil may accumulate in a housing when the lubricating oil is excessively supplied to the housing or when the lubricating oil is not appropriately discharged. The lubricating oil accumulated increases agitation loss of a rotating member such as a rotating shaft, which leads to mechanical loss (mechanical loss) when a turbocharger is driven.

An object of the present invention is to provide a turbocharger capable of inhibiting mechanical loss of a turbocharger by inhibiting agitation loss of a rotating member due to lubricating oil in a housing.

Solution to Problem

According to a first aspect of the present invention, a turbocharger includes a rotating shaft extending along an axis, a turbine wheel provided at a first end portion of the rotating shaft, a compressor wheel provided at a second end portion of the rotating shaft, a housing accommodating at least a portion of the rotating shaft in a longitudinal direction along the axis, bearings provided in the housing and configured to support the rotating shaft to be rotatable around the axis, a supply flow path supplying lubricating oil to the bearings, a discharge oil chamber formed in the housing and to which the lubricating oil is discharged from the bearings, and an oil drainage port formed below the discharge oil chamber and configured to discharge the lubricating oil to the outside of the housing, in which at least the discharge oil chamber from the discharge oil chamber and the oil drainage port is formed to be asymmetric between a first region and a second region defined by a vertical plane including the axis of the rotating shaft as a boundary plane.

According to such a configuration, the lubricating oil supplied from the supply flow path to the bearings passes through the discharge oil chamber thereunder and is discharged from the oil drainage port to the outside of the housing. By forming the discharge oil chamber to be asymmetric between the first region and the second region defined by the vertical plane including the axis of the rotating shaft as a boundary plane, it is possible to enhance a discharge performance of the lubricating oil at a portion in which the lubricating oil easily accumulates in the discharge oil chamber. Thereby, it is possible to inhibit accumulation of the lubricating oil in the discharge oil chamber and inhibit an increase in agitation loss in a rotating member.

According to the turbocharger of a second aspect of the present invention, in the turbocharger according to the first aspect of the present invention, the oil drainage port may be formed to be asymmetric between the first region and the second region defined by the vertical plane including the axis of the rotating shaft as a boundary plane.

In this way, the oil drainage port can be formed in an asymmetric shape corresponding to the shape of the discharge oil chamber. Therefore, a discharge performance of the lubricating oil can be further enhanced.

According to the turbocharger of a third aspect of the present invention, in the turbocharger according to the first aspect or the second aspect, at least one of the discharge oil chamber and the oil drainage port may be formed to be asymmetric between an upstream side and a downstream side in a rotating direction of the rotating shaft at an upper end of the rotating shaft. Further, a cross-sectional area of the discharge oil chamber on the downstream side in the rotating direction of the rotating shaft at the upper end of the rotating shaft may be larger than that on the upstream side in the rotating direction.

In the discharge oil chamber, the lubricating oil coming in contact with the rotating shaft is bounced in the rotating direction of the rotating shaft. Particularly, the lubricating oil flowing from above the rotating shaft in the discharge oil chamber is bounced in the rotating direction of the rotating shaft and thus more lubricating oil accumulates on the downstream side in the rotating direction at the upper end of the rotating shaft. As a result, in the discharge oil chamber, there is a portion in which the lubricating oil easily accumulates according to the rotating direction of the rotating shaft. Therefore, by forming at least one of the discharge oil chamber and the oil drainage port to be asymmetric between the upstream side and the downstream side in the rotating direction of the rotating shaft at the upper end of the rotating shaft, it is possible to enhance a discharge performance of the lubricating oil at a portion in which the lubricating oil easily accumulates according to the rotating direction of the rotation shaft in the discharge oil chamber.

Further, when the cross-sectional area of the discharge oil chamber is made larger on the downstream side in the rotating direction of the rotating shaft at the upper end of the rotating shaft than on the upstream side in the rotating direction thereof, more lubricating oil can be received in the discharge oil chamber. Thereby, it is possible to inhibit obstruction of the flow of the lubricating oil toward the oil drainage port thereunder and enhance the discharge performance of the lubricating oil.

According to the turbocharger of a fourth aspect of the present invention, in the turbocharger according to any one of the first to third aspects, the oil drainage port may be provided to be offset to the downstream side in the rotating direction of the rotating shaft with respect to the vertical plane.

Thereby, the lubricating oil that is easily accumulated on the downstream side in the rotating direction of the rotating shaft in a portion above the rotating shaft in the discharge oil chamber can be discharged smoothly from the oil drainage port that is provided to be offset thereunder.

According to the turbocharger of a fifth aspect of the present invention, in the turbocharger of the third aspect, an inclined surface inclined downward from above from the upstream side in the rotating direction of the rotating shaft to the downstream side may be provided below the discharge oil chamber on the downstream side in the rotating direction of the rotating shaft.

Thereby, the lubricating oil bounced to the downstream side in the rotating direction of the rotating shaft can be made to flow smoothly along the inclined surface toward the oil drainage port. As a result, it is possible to enhance a discharge performance of the lubricating oil.

According to the turbocharger of a sixth aspect of the present invention, in the turbocharger of the fifth aspect, a vertical surface having an inclination angle smaller than that of the inclined surface may be formed below the discharge oil chamber at a portion facing the inclined surface on the upstream side in the rotating direction of the rotating shaft.

Accordingly, when the lubricating oil hits the inclined surface and bounces off, the lubricating oil bouncing off can be received by the vertical surface provided at the portion facing the inclined surface. At this time, since an inclination angle of the vertical surface is smaller than that of the inclined surface, bouncing of the lubricating oil obliquely upward at the vertical surface is inhibited. Thereby, the lubricating oil received by the vertical surface can be made to flow smoothly toward the oil drainage port thereunder.

According to the turbocharger of a seventh aspect of the present invention, in the turbocharger according to the fifth aspect or the sixth aspect, the oil drainage port may be formed to be continuous with a lower side of the inclined surface and may be provided to be offset to the upstream side in the rotating direction at an upper side of the rotating shaft with respect to the vertical plane.

When the oil drainage port is offset in this way, the inclined surface can be formed to be longer toward the upstream side in the rotating direction of the rotating shaft. As a result, the lubricating oil can be made to flow more smoothly toward the oil drainage port.

According to the turbocharger of an eighth aspect of the present invention, in the turbocharger according to any one of the fifth to seventh aspects, the oil drainage port may be inclined downward from above from the upstream side in the rotating direction of the rotating shaft to the downstream side.

Thereby, the lubricating oil bounced to the downstream side in the rotating direction of the rotating shaft can be made to flow smoothly from the inclined surface to the oil drainage port. As a result, it is possible to enhance a discharge performance of the lubricating oil.

According to a ninth aspect of the present invention, in the turbocharger according to any one of the first aspect to the eighth aspect, a cross-sectional shape of the oil drainage port intersecting the vertical plane may be an elliptical shape which is long along the vertical plane.

In this way, as compared with a case in which the oil drainage port has a simple circular cross-sectional shape, it is possible to enlarge a cross-sectional area of the flow path while making the oil drainage port asymmetric. Thus, the lubricating oil flowing in from the discharge oil chamber can be discharged more efficiently.

According to the turbocharger of a tenth aspect of the present invention, in the turbocharger according to any one of the first aspect to the eighth aspect, a cross-sectional shape of the oil drainage port intersecting the vertical plane may be a rectangular shape which is long along the vertical plane.

In this way, as compared with a case in which the oil drainage port has a simple circular cross-sectional shape, it is possible to enlarge a cross-sectional area of the flow path while making the oil drainage port asymmetric. Thus, the lubricating oil flowing in from the discharge oil chamber can be discharged more efficiently.

According to the turbocharger of an eleventh aspect of the present invention, in the turbocharger according to any one of the first aspect to the eighth aspect, a cross-sectional shape of the oil drainage port intersecting the vertical plane may be a T shape in which a dimension in an axial direction increases in stages toward the downstream side.

In this way, as compared with a case in which the oil drainage port has a simple circular cross-sectional shape, it is possible to enlarge a cross-sectional area of the flow path while making the oil drainage port asymmetric. Thus, the lubricating oil flowing in from the discharge oil chamber can be discharged more efficiently.

According to the turbocharger of a twelfth aspect of the present invention, in the turbocharger according to any one of the first aspect to the eighth aspect, a cross-sectional shape of the oil drainage port intersecting the vertical plane may be a triangle shape in which a dimension in an axial direction increases gradually toward the downstream side.

In this way, as compared with a case in which the oil drainage port has a simple circular cross-sectional shape, it is possible to enlarge a cross-sectional area of the flow path while making the oil drainage port asymmetric. Thus, the lubricating oil flowing in from the discharge oil chamber can be discharged more efficiently.

According to the turbocharger of a thirteenth aspect of the present invention, in the turbocharger according to any one of the first aspect to the twelfth aspect, an entrainment-inhibiting portion configured to inhibit entrainment of lubricating oil may be provided in the discharge oil chamber.

In this way, it is possible to inhibit the lubricating oil from being entrained by the rotating shaft. As a result, the discharge performance of the lubricating oil can be further enhanced.

Advantageous Effects of Invention

According to the turbocharger described above, it is possible to inhibit mechanical loss of the turbocharger by inhibiting agitation loss of the rotating member due to the lubricating oil in the housing.

DESCRIPTION OF EMBODIMENTS

First Embodiment

Figure 1:
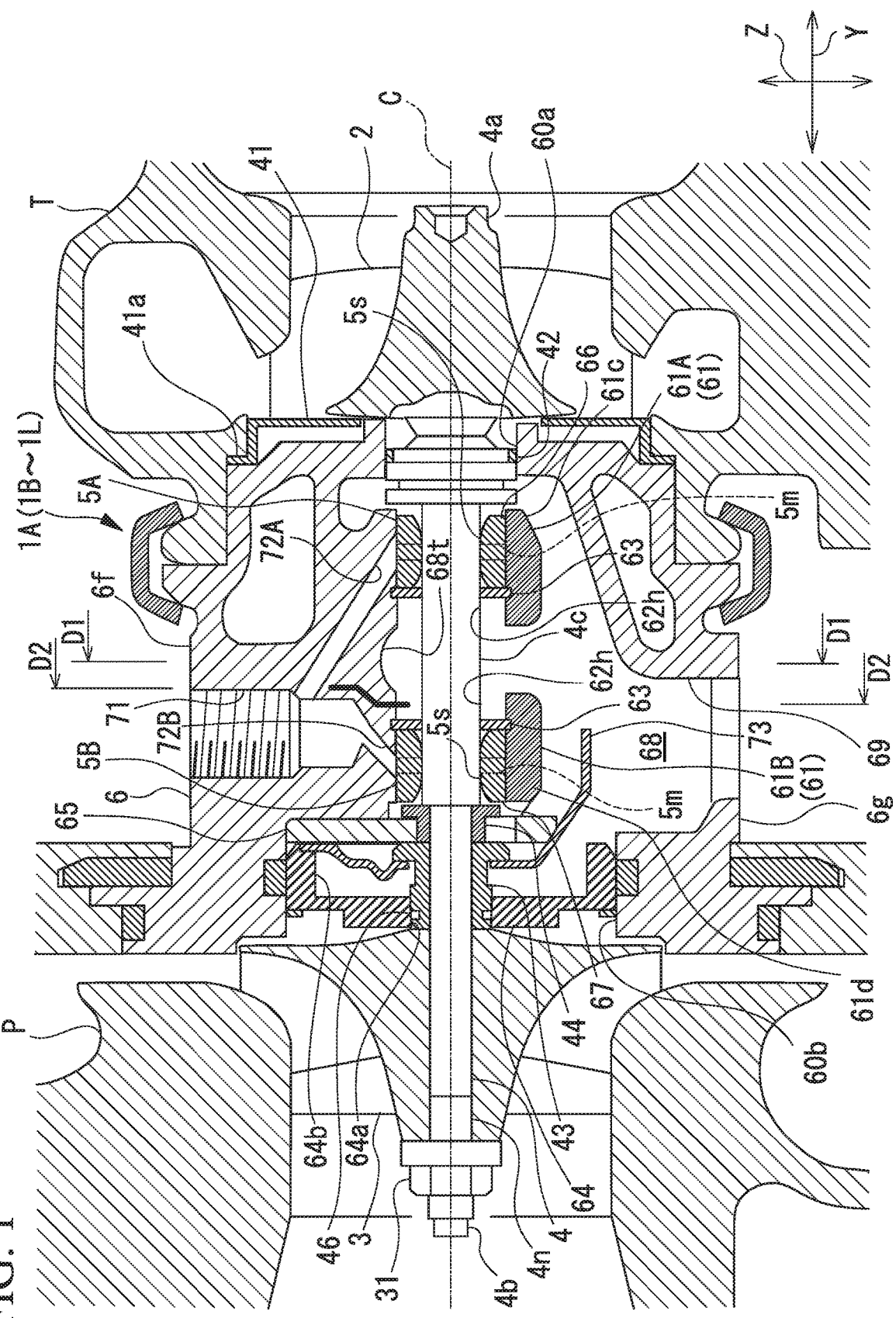
FIG. 1 is a cross-sectional view showing a configuration of a turbocharger in a first embodiment of the present invention.

FIG. 1 is a cross-sectional view showing a configuration of a turbocharger in a first embodiment of the present invention.

As shown in FIG. 1, the turbocharger 1A includes a turbine wheel 2, a compressor wheel 3, a rotating shaft 4, journal bearings (bearings) 5A and 5B, and a housing 6. The turbocharger 1A is mounted, for example, on an automobile or the like as an auxiliary device of an engine in such a posture that the rotating shaft 4 extends in a horizontal direction.

A single dotted-dashed line shown in FIG. 1 shows a central axis (axis) C of the rotating shaft 4.

In the following description, a side facing upward in a state in which the turbocharger 1A is mounted on an automobile or the like is referred to as "upper," and a side facing downward is referred to as "lower." Further, a vertical direction is a Z direction, a direction in which the central axis C of the rotating shaft 4 extends is a Y direction, and a direction perpendicular to the Z direction and the Y direction is an X direction.

In the turbocharger 1A, the turbine wheel 2 provided in a turbine T is rotated about the central axis C by an exhaust gas flow supplied from an engine (not shown) to the turbine T. The rotating shaft 4 and the compressor wheel 3 rotate about the central axis C as the turbine wheel 2 rotates. The compressor wheel 3 provided in a compressor P compresses air by its rotation. The air compressed by the compressor P is supplied to an engine (not shown).

The housing 6 is supported by a vehicle body or the like via a bracket (not shown), the compressor P, the turbine T, and the like. The housing 6 includes bearing accommodating portions 61A and 61B for accommodating the journal bearings 5A and 5B therein. The housing 6 has an opening 60a at one end thereof and an opening 60b at the other end thereof. The rotating shaft 4 is supported by the journal bearings 5A and 5B accommodated in the bearing accommodating portions 61A and 61B to be rotatable around the central axis C. A first end portion 4a and a second end portion 4b of the rotating shaft 4 protrude to the outside of the housing 6 through the openings 60a and 60b. That is, a portion of the rotating shaft 4 in a longitudinal direction along the central axis C is accommodated in the housing 6.

In an axial direction in which the central axis C extends, the turbine wheel 2 is provided on a first side of the housing 6, and the compressor wheel 3 is provided on a second side of the housing 6. The turbine wheel 2 is provided integrally with the first end portion 4a of the rotating shaft 4. The compressor wheel 3 is coupled by screwing a nut 31 into a threaded portion 4n formed at the second end portion 4b of the rotating shaft 4. The rotating shaft 4, the turbine wheel 2 and the compressor wheel 3 rotate around the central axis C integrally with the rotating shaft 4.

The bearing accommodating portions 61A and 61B formed inside the housing 6 are provided spaced apart from each other in a Y direction along the central axis C. The bearing accommodating portions 61A and 61B are respectively provided on a side close to the first end portion 4a and a side close to the second end portion 4b of the rotating shaft 4.

Each of the bearing accommodating portions 61A and 61B is formed to have a circular cross section when viewed from the Y direction. The bearing accommodating portions 61A and 61B are consecutively formed in the Y direction in which the central axis C extends.

The journal bearings 5A and 5B are accommodated in the respective bearing accommodating portions 61A and 61B. Thereby, the rotating shaft 4 is rotatably supported by the journal bearings 5A and 5B provided spaced apart from each other in the Y direction.

Each of the journal bearings 5A and 5B is formed in an annular shape. Each of the journal bearings 5A and 5B has a sliding surface 5s formed in an arc shape on an inner circumferential side thereof. The journal bearings 5A and 5B each have a communication hole 5m. A plurality of communication holes 5m are formed at predetermined intervals in a circumferential direction of the journal bearings 5A and 5B. The communication holes 5m penetrate in a radial direction of the journal bearings 5A and 5B at a middle portion of the journal bearings 5A and 5B in the Y direction. On the other hand, an oil groove (not shown) continuous in a circumferential direction and configured to communicate with supply flow paths 72A and 72B is formed on an inner peripheral surface of the housing 6 facing the communication holes 5m. That is, lubricating oil is supplied from the supply flow paths 72A and 72B to the oil groove, and is supplied from the oil groove to the sliding surface 5s of the journal bearings 5A and 5B via the communication holes 5m.

End surfaces of the journal bearings 5A and 5B on a central portion 4c side in the Y direction of the rotating shaft 4 respectively abut against snap rings 63. The journal bearings 5A and 5B are positioned in a thrust direction by these snap rings 63.

The central portion 4c in the Y direction of the rotating shaft 4 is exposed to an upper portion of a discharge oil chamber 68 to be described below.

The rotating shaft 4 includes a thrust sleeve 43 and a thrust ring 44. The thrust sleeve 43 and the thrust ring 44 are provided with respect to the journal bearing 5B on the side close to the second end portion 4b of the rotating shaft 4. Each of the thrust sleeve 43 and the thrust ring 44 has a cylindrical shape, and the rotating shaft 4 is inserted into the inside thereof. The thrust sleeve 43 and the thrust ring 44 have an outer diameter larger than an inner diameter of the journal bearing 5B and are sandwiched between the journal bearing 5B and the compressor wheel 3.

A gap 66 is formed at an end portion 61c of the bearing accommodating portion 61A on the side close to the first end portion 4a of the rotating shaft 4, and a gap 67 is formed at an end portion 61d of the bearing accommodating portion 61B on the side close to the second end portion 4b. Lubricating oil can be made to flow downward via these gaps 66 and 67.

A plate 41 is provided between the housing 6 and the turbine wheel 2 in a direction in which the rotating shaft 4 extends. The plate 41 has a function of inhibiting heat transfer from the turbine T to the housing 6 and sealing a gas not to leak out from the turbine T. A peripheral edge portion 41a of the plate 41 is sandwiched and held between a turbine housing TH and the housing 6 in the direction in which the rotating shaft 4 extends.

An oil ring 42 is provided on an outer circumferential portion of the rotating shaft 4 on a side close to the second end portion 4b of the rotating shaft 4 with respect to the plate 41. Sealing between the opening 60a and the rotating shaft 4 is maintained by the oil ring 42.

A pressing member 64 for closing the opening 60b and pressing down a thrust bearing 65 is provided in the opening 60b of the housing 6. A through hole 64a through which the thrust sleeve 43 passes is provided in a center portion of the pressing member 64. A circumferential wall portion 64b extending toward the first end portion 4a of the rotating shaft 4 is integrally formed on an outer circumferential portion of the pressing member 64. The pressing member 64 is attached to close the opening 60b in a state in which the thrust sleeve 43 is inserted into the through hole 64a. The circumferential wall portion 64b of the pressing member 64 is provided in a state of pressing a plate-shaped thrust bearing 65 provided on an outer circumferential portion of the thrust ring 44 against the first end portion 4a side of the rotating shaft 4 in the direction in which the rotating shaft 4 extends.

An annular seal ring 46 is provided on an outer circumferential surface of the thrust sleeve 43 at a position inside the through hole 64a. The seal ring 46 seals lubricating oil not to flow out from between the through hole 64a of the pressing member 64 and the thrust sleeve 43.

The housing 6 includes an oil supply pipe connection port 71 extending toward a radial inner side of the housing 6 from an outer peripheral surface 6f at an uppermost portion of the housing 6. Lubricating oil supply pipe (not shown) for supplying lubricating oil from the outside of the housing 6 is connected to the oil supply pipe connection port 71.

The supply flow paths 72A and 72B are formed between a distal end portion of the oil supply pipe connection port 71 and the bearing accommodating portions 61A and 61B. The supply flow path 72A on the side close to the first end portion 4a of the rotating shaft 4 opens toward the communication holes 5m of the journal bearing 5A. The supply flow path 72A on the side close to the second end portion 4b of the rotating shaft 4 opens toward the communication holes 5m of the journal bearing 5B.

The housing 6 includes the discharge oil chamber 68 below the bearing accommodating portions 61A and 61B. The gaps 66 and 67 described above open at an upper portion of the discharge oil chamber 68.

The housing 6 includes an oil drainage port 69 penetrating a lower end portion of the discharge oil chamber 68 and an outer peripheral surface 6g at a lowermost portion of the housing 6, and opening downward. A flange 70 (see FIG. 4) to which a pipe (not shown) for discharging the lubricating oil is connected can be provided in the oil drainage port 69.

In the discharge oil chamber 68, a guide member 73 supported by the thrust sleeve 43 is provided below the bearing accommodating portion 61B. The guide member 73 is formed to extend from a position close to the gap 67 between the bearing accommodating portion 61B and the thrust ring 44 toward the first end portion 4a side of the rotating shaft 4.

In such a turbocharger 1A, when lubricating oil is sent from a lubricating oil supply pipe (not shown) connected to the oil supply pipe connection port 71, the lubricating oil passes from the oil supply pipe connection port 71 through the two supply flow paths 72A and 72B and is sent into the bearing accommodating portions 61A and 61B. In the bearing accommodating portions 61A and 61B, the lubricating oil is supplied to the communication holes 5m of the journal bearings 5A and 5B, and is sent to the inside of the journal bearings 5A and 5B through the communication holes 5m. Thereby, the lubricating oil is supplied between the journal bearings 5A and 5B, and the rotating shaft 4.

The lubricating oil sent into the bearing accommodating portion 61A and supplied between the journal bearing 5A and the rotating shaft 4 flows out into the discharge oil chamber 68 at the central portion 4c of the rotating shaft 4, that is, between the two snap rings 63.

Further, the lubricating oil supplied between the journal bearing 5A and the rotating shaft 4 is discharged from the gap 66 on the first end portion 4a side to the discharge oil chamber 68. The lubricating oil sent into the bearing accommodating portion 61B and supplied between the journal bearing 5B and the rotating shaft 4 passes through the gap 67 on the second end portion 4b side and is discharged to the discharge oil chamber 68. At this time, the lubricating oil discharged from the gap 67 does not directly fall to the oil drainage port 69 but is discharged into the discharge oil chamber 68 due to the guide member 73.

The lubricating oil discharged to the discharge oil chamber 68 flows toward the oil drainage port 69 due to gravity and is discharged from the oil drainage port 69 to the outside of the housing 6.

Figure 2:
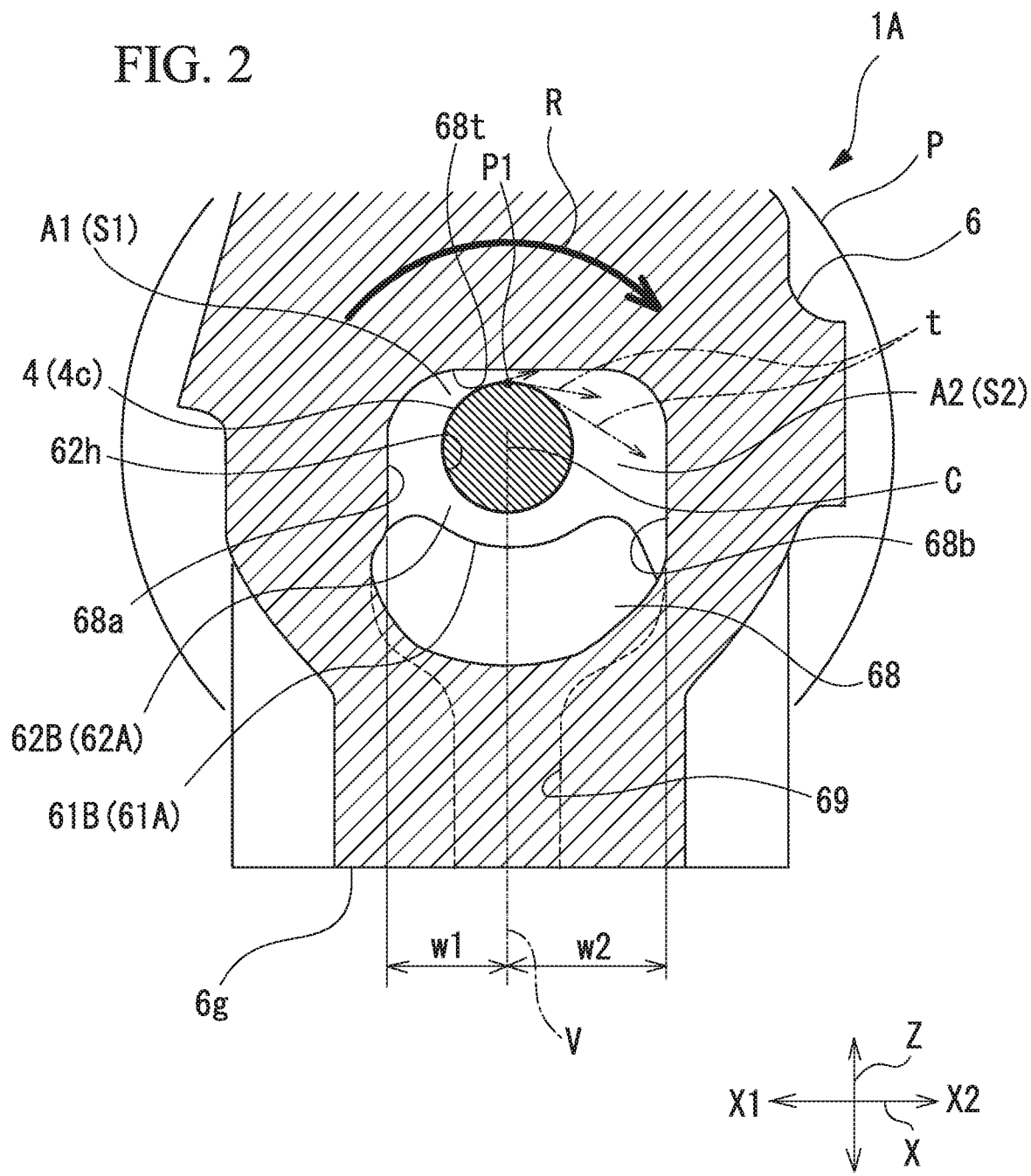
FIG. 2 is a view showing a configuration of the turbocharger in the first embodiment of the present invention and is a cross-sectional view taken along a line indicated by arrows D1-D1 in FIG. 1.

FIG. 2 is a view showing a configuration of the turbocharger in the first embodiment of the present invention and is a cross-sectional view taken along a line indicated by arrows D1-D1 in FIG. 1.

As shown in FIG. 2, in the turbocharger 1A of this embodiment, the discharge oil chamber 68 is asymmetrically formed with a vertical plane V including the central axis C of the rotating shaft 4 as a boundary plane in a width direction X at a portion in which the central portion 4c of the rotating shaft 4 is exposed between the bearing accommodating portions 61A and 61B.

In this embodiment, in the discharge oil chamber 68, respective distances w1 and w2 from the central axis C to a side wall surface 68a on a first side in the width direction X and to a side wall surface 68b on a second side are different from each other in a width direction X perpendicular to the central axis C of the rotating shaft 4 and the vertical direction Z. Here, the side wall surface 68b positioned on a downstream side (second region) X2 in a rotating direction R at an upper end P1 of the rotating shaft 4 is set such that the distance w2 from the central axis C is larger than the distance w1 of the side wall surface 68a positioned on an upstream side (first region) X1 from the central axis C. The upper end P1 described above is a position of an uppermost end in the cross section of FIG. 2 perpendicular to the central axis C of the rotating shaft 4.

The "downstream side in a rotating direction R" described above can be said to be a front side in the rotating direction R in a direction in which a tangent of the rotating shaft 4 extends at the upper end P1. Similarly, the "upstream side in the rotating direction R" can be said to be a rear side in the rotating direction R in a direction in which a tangential direction of the rotating shaft 4 extends at the upper end P1.

Thereby, in the discharge oil chamber 68, in the width direction X, a cross-sectional area S2 on a side close to the side wall surface 68b with respect to the central axis C is larger than the cross-sectional area S1 on a side close to the side wall surface 68a. In other words, in the discharge oil chamber 68, the cross-sectional area S2 of a region A2 on the downstream side X2 in the rotating direction R is larger than the cross-sectional area S1 of a region A1 on the upstream side X1 in the rotating direction R.

When the lubricating oil discharged into the discharge oil chamber 68 comes into contact with the rotating shaft 4 in rotation, the lubricating oil is blown in a tangential direction tin the rotating direction R of the rotating shaft 4. Of the lubricating oil blown by the rotating shaft 4 as described above, the lubricating oil blown downward is directly directed toward the oil drainage port 69. In contrast, the lubricating oil blown above the discharge oil chamber 68 by the rotating shaft 4 hits an upper surface 68t or the side wall surfaces 68a and 68b of the discharge oil chamber 68 and then flows downward. At this time, more lubricating oil is blown to the downstream side X2 in the rotating direction R of the rotating shaft 4 than to the upstream side X1.

In contrast, in the discharge oil chamber 68, since the cross-sectional area S2 of the region A2 on the downstream side X2 in the rotating direction R is larger than the cross-sectional area S1 of the region A1 on the upstream side X1 in the rotating direction R at an upper side of the rotating shaft 4, the lubricating oil blown to the downstream side in the rotating direction R cannot easily stay in the region A2 of the discharge oil chamber 68 and quickly flows downward.

According to the turbocharger 1A of the above-described embodiment, the discharge oil chamber 68 includes the upstream side X1 in the rotating direction R and the downstream side X2 in the rotating direction R which are asymmetrically formed with the vertical plane V including the central axis C of the rotating shaft 4 as a boundary plane. When the cross-sectional area of the discharge oil chamber 68 is made larger on the downstream side X2 in the rotating direction R of the rotating shaft 4 at the upper end P1 of the rotating shaft 4 than on the upstream side X1, more lubricating oil can be received by the discharge oil chamber 68. Thereby, it is possible to inhibit the lubricating oil from stagnating at a portion on the downstream side X2 in the rotating direction R in which the lubricating oil easily accumulates and thus enhance a discharge performance of the lubricating oil in the discharge oil chamber 68. Thus, it is possible to inhibit an increase in agitation loss of the rotating shaft 4. As a result, mechanical loss of the turbocharger 1A can be inhibited.

Modified Example of First Embodiment

In the first embodiment, in the portion in which the central portion 4c of the rotating shaft 4 is exposed between the bearing accommodating portions 61A and 61B, the respective distances w1 and w2 from the central axis C to the side wall surface 68a and to the side wall surface 68b are made different in the width direction X in order to form the discharge oil chamber 68 to be asymmetric in the width direction X with the vertical plane V including the central axis C of the rotating shaft 4 as a boundary plane, but the present invention is not limited thereto.

Figure 3:
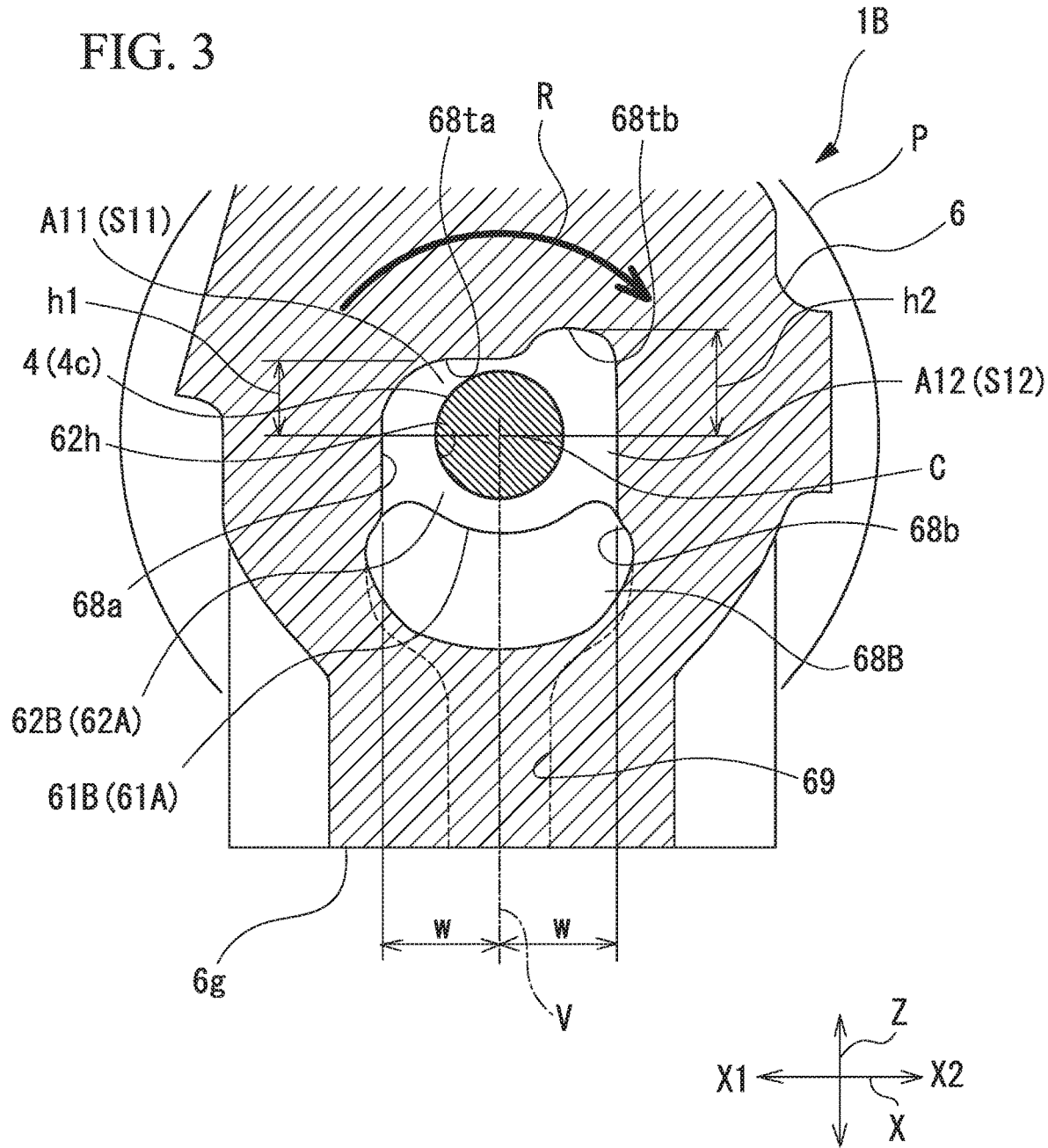
FIG. 3 is a view showing a modified example of the turbocharger in the first embodiment of the present invention and is a cross-sectional view taken along a line indicated by arrows D1-D1 in FIG. 1.

FIG. 3 is a view showing a modified example of the turbocharger in the first embodiment of the present invention and is a cross-sectional view taken along a line indicated by arrows D1-D1 in FIG. 1.

As shown in FIG. 3, in a discharge oil chamber 68B of a turbocharger 1B, respective distances h1 and h2 in a vertical direction from a central axis C to an upper surface 68ta on a first side in a width direction X and to an upper surface 68tb on a second side are different from each other. Here, an upper side of a rotating shaft 4 is set such that the distance h2 of the upper surface 68tb on a downstream side X2 in a rotating direction R of the rotating shaft 4 from the central axis C is larger than the distance h1 of the upper surface 68ta on an upstream side X1 in the rotating direction R of the rotating shaft 4 from the central axis C.

In this case, a distance w in the width direction X from the central axis C to a side wall surface 68a on the first side and to a side wall surface 68b on the second side may be the same.

Thereby, in the discharge oil chamber 68B, a cross-sectional area S12 on a side close to the upper surface 68tb in the width direction X with respect to the central axis C is larger than a cross-sectional area S11 on a side close to the upper surface 68ta in the width direction X. In other words, in the discharge oil chamber 68, the cross-sectional area S12 of a region A12 which is a downstream side in the rotating direction R at an upper side of the rotating shaft 4 is larger than the cross-sectional area S11 of a region A11 which is an upstream side in the rotating direction R.

Even with such a configuration, in the turbocharger 1B, the discharge oil chamber 68B is asymmetrically formed with a vertical plane V including the central axis C of the rotating shaft 4 as a boundary plane in the width direction X.

Thereby, as in the first embodiment, it is possible to inhibit lubricating oil from stagnating at a portion on the downstream side X2 in the rotating direction R in which the lubricating oil easily accumulates and thus enhance a discharge performance of the lubricating oil in the discharge oil chamber 68B. Thus, it is possible to inhibit an increase in agitation loss of the rotating shaft 4. As a result, mechanical loss of the turbocharger 1B can be inhibited.

In addition to the modified examples described above, any other configuration may be used as long as the discharge oil chambers 68 and 68B can be asymmetrically formed with the vertical plane V including the central axis C of the rotating shaft 4 as a boundary plane in the width direction X.

The configurations shown in the first embodiment and its modified examples are not limited to the portion in which the central portion 4c of the rotating shaft 4 is exposed between the bearing accommodating portions 61A and 61B in the discharge oil chamber 68, and the same configuration can be applied to any portion in which the lubricating oil is accumulated.

Second Embodiment

Next, a second embodiment of a turbocharger according to the present invention will be described. A turbocharger 1C shown in the second embodiment differs from the turbochargers 1A and 1B of the first embodiment only in a configuration of an oil drainage port 69C. Therefore, in the description of the second embodiment, portions the same as those in the first embodiment are denoted by the same reference signs, and duplicate description thereof will be omitted. That is, descriptions common to the overall configuration of the turbochargers 1A and 1B described in the first embodiment, will be omitted.

Figure 4:
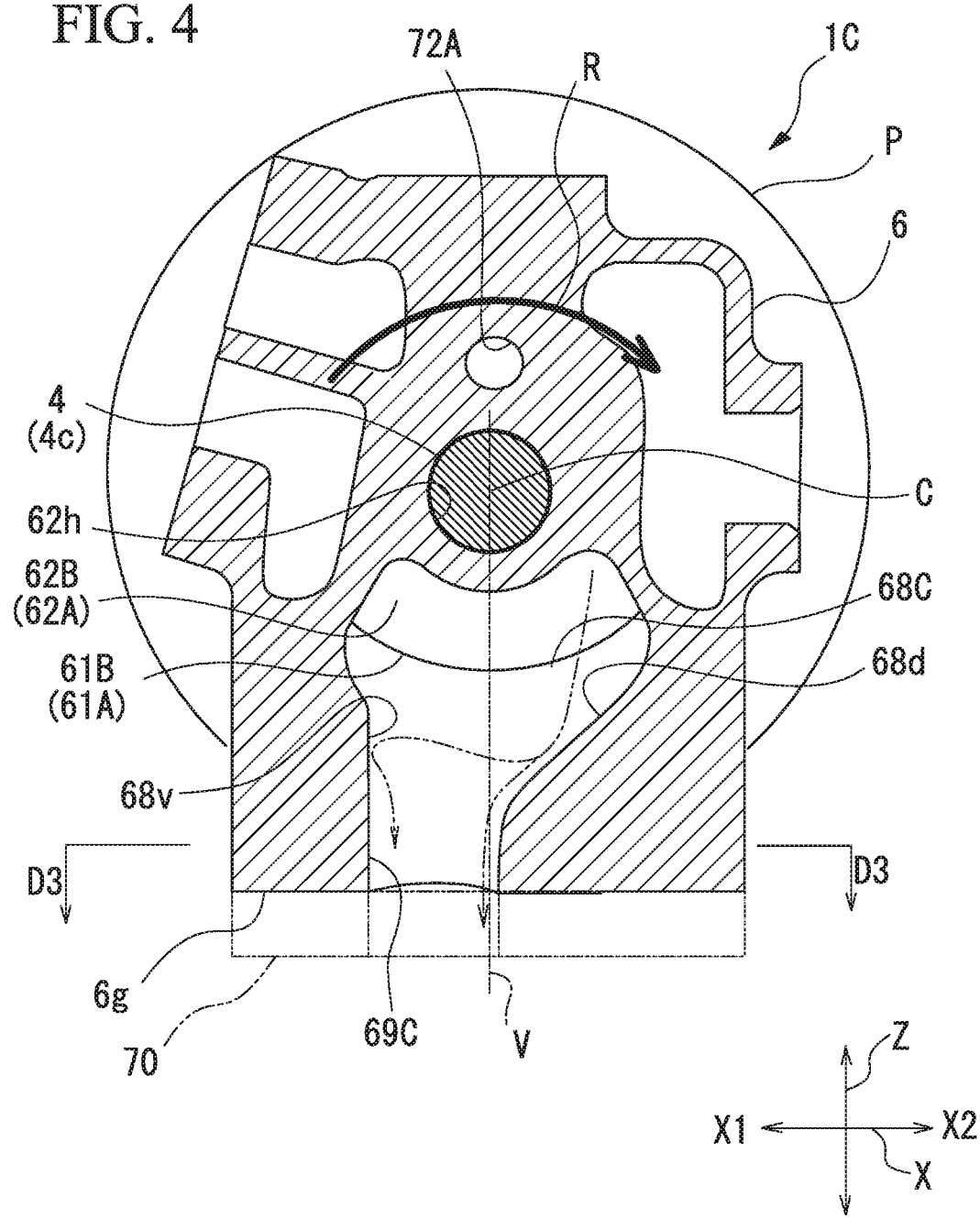
FIG. 4 is a view showing a configuration of a turbocharger in a second embodiment of the present invention, and is a cross-sectional view taken along a line indicated by arrows D2-D2 in FIG. 1.

FIG. 4 is a view showing a configuration of a turbocharger in a second embodiment of the present invention, and is a cross-sectional view taken along a line indicated by arrows D2-D2 in FIG. 1.

As shown in FIG. 4, the oil drainage port 69C formed below a discharge oil chamber 68C of the housing 6 of the turbocharger 1C is asymmetrically formed with a vertical plane V including a central axis C of a rotating shaft 4 as a boundary plane in the width direction X.

In this embodiment, the oil drainage port 69C is formed to be offset to an upstream side X1 in a rotating direction R in the width direction X with respect to the central axis C of the rotating shaft 4.

In the discharge oil chamber 68C formed above the oil drainage port 69C, a bottom surface thereof on a downstream side X2 in the rotating direction R in the width direction X is an inclined surface 68d gradually inclined downward toward the oil drainage port 69C. That is, the inclined surface 68d is inclined downward from above from an upstream side X1 to the downstream side X2 in the rotating direction R. For convenience of illustration, a left side of the vertical plane V is referred to as an "upstream side X1" and a right side as a "downstream side X2," but a flow of lubricating oil below the rotating shaft 4 is referred to such that the "downstream side X2" is upstream and the "upstream side X1" is downstream.

In the discharge oil chamber 68C, a vertical surface 68v extending in a vertical direction Z is formed at a portion facing the inclined surface 68d on the upstream side X1 in the rotating direction R. An inclination angle of the vertical surface 68v from the vertical plane V is smaller than that of the inclined surface 68d.

With such a configuration, lubricating oil discharged into the discharge oil chamber 68C and blown above the discharge oil chamber 68C by the rotating shaft 4 tends to accumulate more on the downstream side in the rotating direction R of the rotating shaft 4 than on the upstream side. In contrast, since the discharge oil chamber 68C has the inclined surface 68d formed at a bottom portion on the downstream side X2 in the rotating direction R and the oil drainage port 69C is offset to the downstream side in the rotating direction R, the lubricating oil quickly flows down to the oil drainage port 69C thereunder.

Since the vertical surface 68v is formed at a portion facing the inclined surface 68d in the width direction X, the vertical surface 68v can receive the lubricating oil bounced off the inclined surface 68d and lead it to the oil drainage port 69C thereunder.

In the turbocharger 1C of this embodiment, the lubricating oil bounced to the downstream side X2 in the rotating direction R of the rotating shaft 4 can be made to flow smoothly along the inclined surface 68d toward the oil drainage port 69C. Thereby, it is possible to enhance a discharge performance of the lubricating oil.

When the lubricating oil hits the inclined surface 68d and bounces off, the lubricating oil bounced off can be received by the vertical surface 68v provided at the portion facing the inclined surface 68d. At this time, since an inclination angle of the vertical surface 68v is smaller than that of the inclined surface 68d, the lubricating oil being bounced obliquely upward at the vertical surface 68v is inhibited. Thereby, the lubricating oil received by the vertical surface 68v can be made to flow smoothly toward the oil drainage port 69C thereunder.

Further, the oil drainage port 69C is formed to be continuous with a lower side of the inclined surface 68d and is provided to be offset to the upstream side X1 in the rotating direction R of the rotating shaft 4 with respect to the vertical plane V. Thereby, the inclined surface 68d can be formed to be longer toward the upstream side X1 in the rotating direction R of the rotating shaft 4. As a result, the lubricating oil can be made to flow more smoothly toward the oil drainage port 69C. Further, when the lubricating oil flows through the inside of the oil drainage port 69C, it is possible to inhibit the lubricating oil from biasedly flowing in a circumferential direction of the oil drainage port 69C. As a result, the lubricating oil can be discharged smoothly.

Further, as in the first embodiment described above, in the discharge oil chamber 68C, it is possible to inhibit the lubricating oil from stagnating at a portion on the downstream side X2 in the rotating direction R in which the lubricating oil easily accumulates and thus enhance a discharge performance of the lubricating oil. Thus, it is possible to inhibit an increase in agitation loss of the rotating shaft 4. As a result, mechanical loss of the turbocharger 1C can be inhibited.

First Modified Example of Second Embodiment

In the second embodiment, the oil drainage port 69C is offset to the downstream side in the rotating direction R, but the present invention is not limited thereto.

Figure 5:
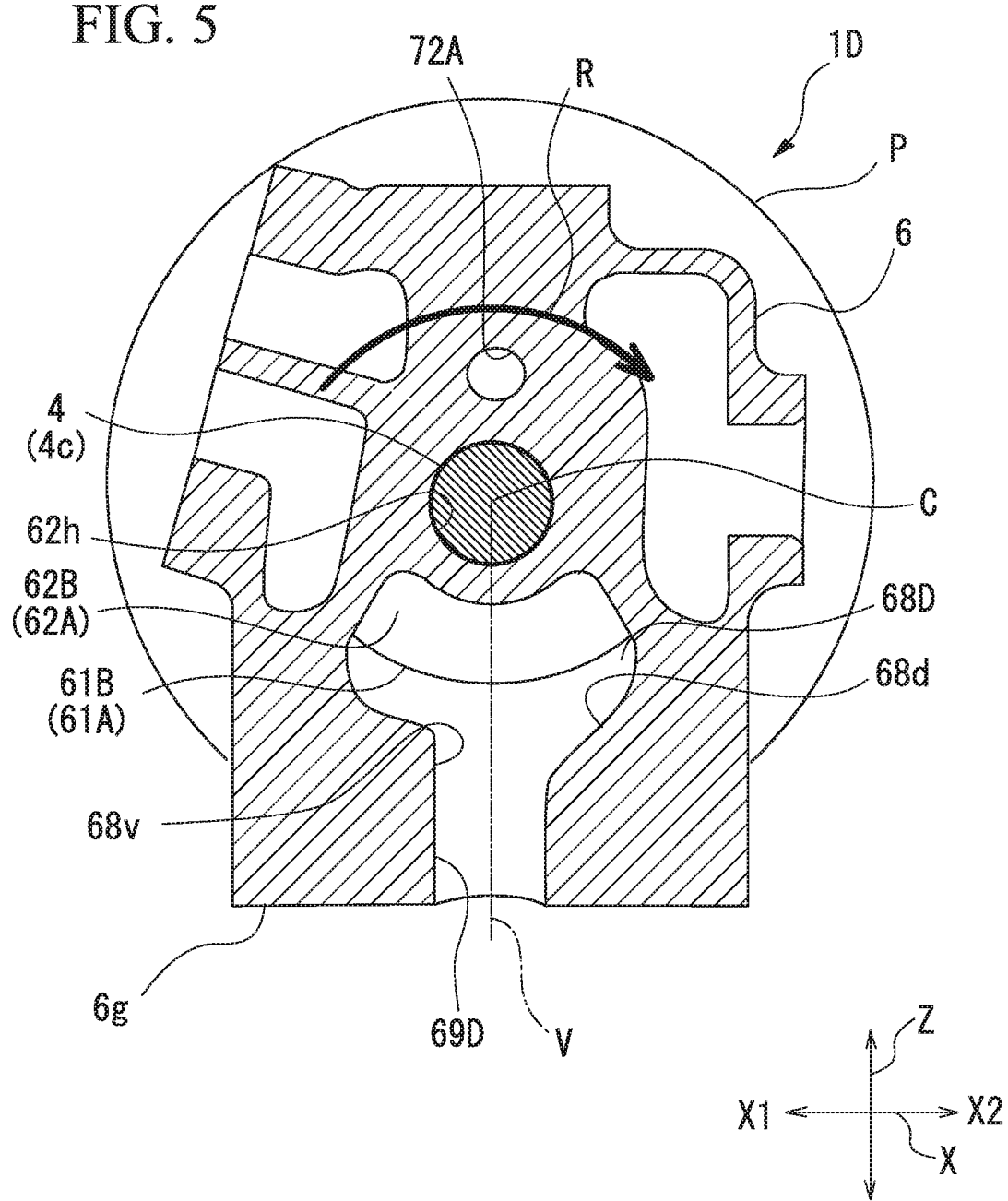
FIG. 5 is a view showing a configuration of a first modified example of the turbocharger in the second embodiment of the present invention, and is a cross-sectional view taken along a line indicated by arrows D2-D2 in FIG. 1.

FIG. 5 is a view showing a configuration of a first modified example of the turbocharger in the second embodiment of the present invention, and is a cross-sectional view taken along a line indicated by arrows D2-D2 in FIG. 1.

As shown in FIG. 5, in this modified example, an oil drainage port 69D may be formed at the same position as a central axis C of a rotating shaft 4 in the width direction X without being offset. In this case, in a discharge oil chamber 68D, when an inclined surface 68d is formed at a bottom portion on the downstream side X2 in a rotating direction R at an upper side of the rotating shaft 4, lubricating oil can be made to flow downward quickly to the oil drainage port 69 thereunder.

Also in this case, it is preferable that the discharge oil chamber 68D have a vertical surface 68v formed at a portion facing the inclined surface 68d in the width direction X.

Also in such a configuration, the lubricating oil bounced to the downstream side X2 in the rotating direction R of the rotating shaft 4 can be made to flow smoothly along the inclined surface 68d toward the oil drainage port 69C.

Further, when the lubricating oil hits the inclined surface 68d and bounces off, the lubricating oil bounced off can be received by the vertical surface 68v provided at a portion facing the inclined surface 68d.

Thereby, the lubricating oil received by the vertical surface 68v can be made to flow smoothly toward the oil drainage port 69D thereunder.

Thereby, in the discharge oil chamber 68D, it is possible to inhibit the lubricating oil from stagnating at a portion on the downstream side X2 in the rotating direction R in which the lubricating oil easily accumulates and thus enhance a discharge performance of the lubricating oil. Thus, it is possible to inhibit an increase in agitation loss of the rotating shaft 4. As a result, mechanical loss of the turbocharger 1D can be inhibited.

Second Modified Example of Second Embodiment

Figure 6:
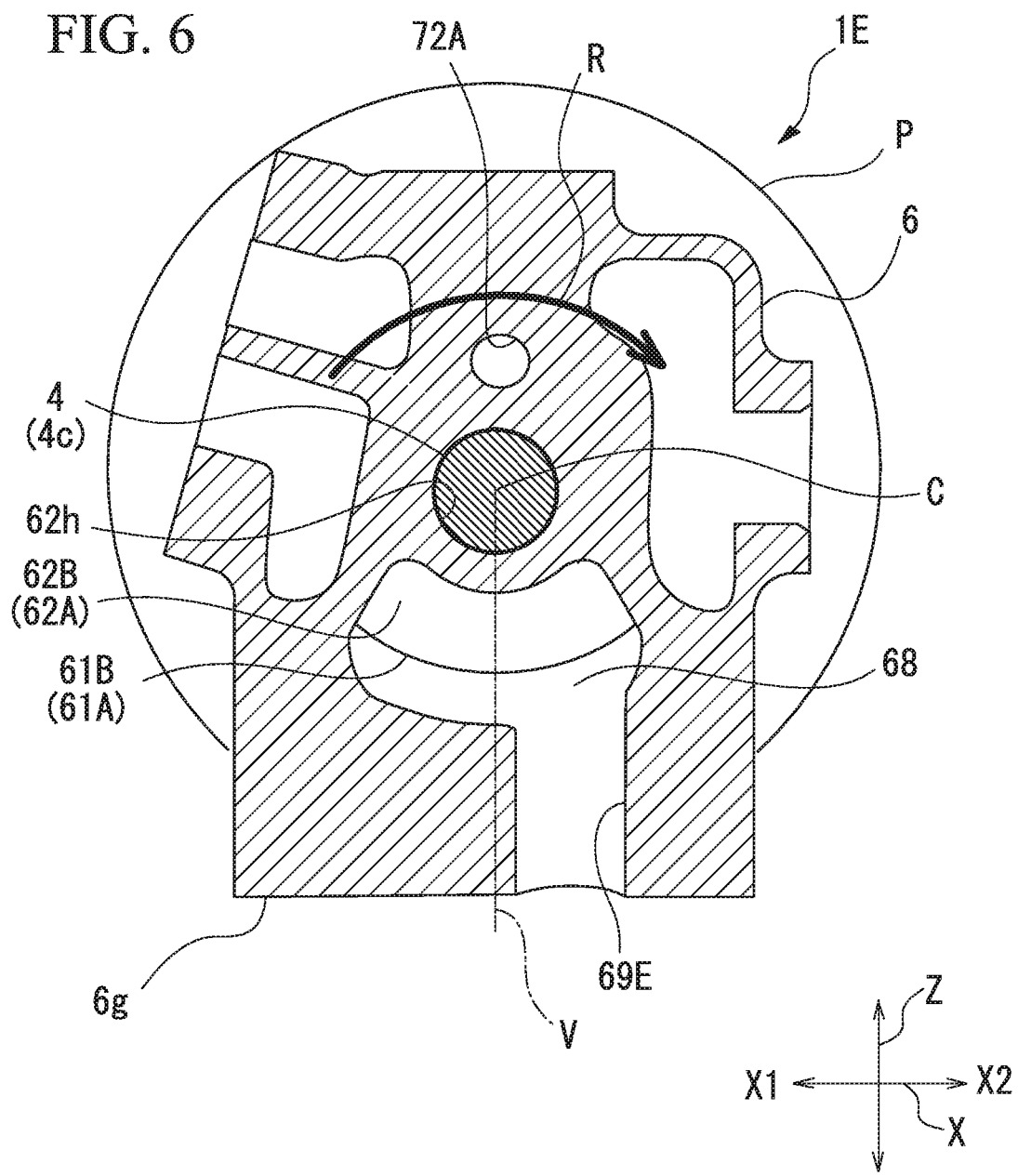
FIG. 6 is a view showing a configuration of a second modified example of the turbocharger in the second embodiment of the present invention, and is a cross-sectional view taken along a line indicated by arrows D2-D2 in FIG. 1.

FIG. 6 is a view showing a configuration of a second modified example of the turbocharger in the second embodiment of the present invention, and is a cross-sectional view taken along a line indicated by arrows D2-D2 in FIG. 1.

As shown in FIG. 6, in this modified example, an oil drainage port 69E is formed to be offset to the downstream side X2 in a rotating direction R at an upper side of a rotating shaft 4 in the width direction X with respect to a central axis C of a rotating shaft 4.

With such a configuration, lubricating oil blown above a discharge oil chamber 68 by the rotating shaft 4 tends to accumulate more on the downstream side X2 in the rotating direction R of the rotating shaft 4. In contrast, since the oil drainage port 69E is offset to the downstream side X2 in the rotating direction R, the lubricating oil accumulated in an upper portion of the discharge oil chamber 68 directly flows down quickly to the oil drainage port 69E thereunder.

Also in such a configuration, the lubricating oil that is easily accumulated on the downstream side X2 in the rotating direction R of the rotating shaft 4 at a portion above the rotating shaft 4 in the discharge oil chamber 68 can be discharged smoothly from the oil drainage port 69E that is provided to be offset thereunder.

Thereby, in the discharge oil chamber 68, it is possible to inhibit the lubricating oil from stagnating at a portion on the downstream side X2 in the rotating direction R in which the lubricating oil easily accumulates and thus enhance a discharge performance of the lubricating oil. Thus, it is possible to inhibit an increase in agitation loss of the rotating shaft 4. As a result, mechanical loss of the turbocharger 1E can be inhibited.

Third Embodiment

Next, a third embodiment of a turbocharger according to the present invention will be described. The turbocharger according to the third embodiment differs from the turbocharger 1C shown in the second embodiment only in a cross-sectional shape of an oil drainage port 69F. Therefore, in the description of the third embodiment, same portions are denoted by same reference signs, and duplicate description thereof will be omitted. That is, differences from the second embodiment will be mainly described, and descriptions common to configurations of the turbochargers 1A and 1C described in the first and second embodiments will be omitted.

Figure 7:
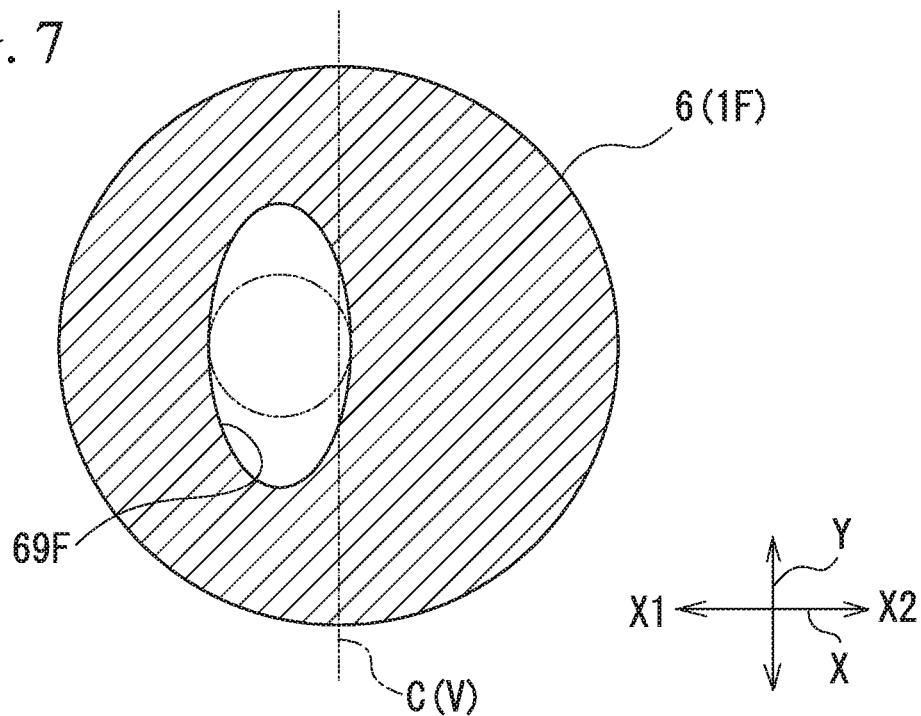
FIG. 7 is a view showing a configuration of a turbocharger in a third embodiment of the present invention, and is a cross-sectional view taken along a line indicated by arrows D3-D3 in FIG. 4.

FIG. 7 is a view showing a configuration of a turbocharger in the third embodiment of the present invention and is a cross-sectional view taken along a line indicated by arrows D3-D3 in FIG. 4.

As shown in FIG. 7, the oil drainage port 69F formed below a housing 6 of a turbocharger 1F has the same configuration as the second embodiment shown in FIG. 4 and is asymmetrically formed with a vertical plane V including a central axis C of a rotating shaft 4 as a boundary plane in a width direction X.

In this embodiment, the oil drainage port 69F is formed to be offset to the upstream side X1 in a rotating direction R at an upper side of the rotating shaft 4 in the width direction X with respect to the central axis C of the rotating shaft 4. In the oil drainage port 69F, a cross-sectional shape perpendicular to a vertical direction Z is an elliptical shape, in which an opening dimension in an axial direction Y along the central axis C is larger than an opening dimension in the width direction X.

According to such a configuration, as compared with a case in which the cross-sectional shape of the oil drainage port 69F is a simple circular shape (as indicated by a double dotted-dashed line in FIG. 7), the oil drainage port can have an enlarged cross-sectional area of a flow path while the oil drainage port 69F is offset. Accordingly, lubricating oil flowing in from a discharge oil chamber 68 can be discharged more efficiently.

According to the turbocharger 1F of this embodiment, as in the second embodiment described above, in the discharge oil chamber 68C, it is possible to inhibit the lubricating oil from stagnating at a portion on the downstream side X2 in the rotating direction R in which the lubricating oil easily accumulates and thus enhance a discharge performance of the lubricating oil.

In addition, since the oil drainage port 69F can secure an increased cross-sectional area of the flow path while being offset toward the first side in the width direction X, the lubricating oil flowing in from the discharge oil chamber 68 can be discharged more efficiently.

Thus, it is possible to inhibit an increase in agitation loss of the rotating shaft 4. As a result, mechanical loss of the turbocharger 1F can be inhibited.

First Modified Example of Third Embodiment

In the third embodiment, the oil drainage port 69F which is offset to the upstream side X1 in the rotating direction R at an upper side of the rotating shaft 4 in the width direction X is formed to have an elliptical shape in a cross-sectional view, but the present invention is not limited thereto.

Figure 8:
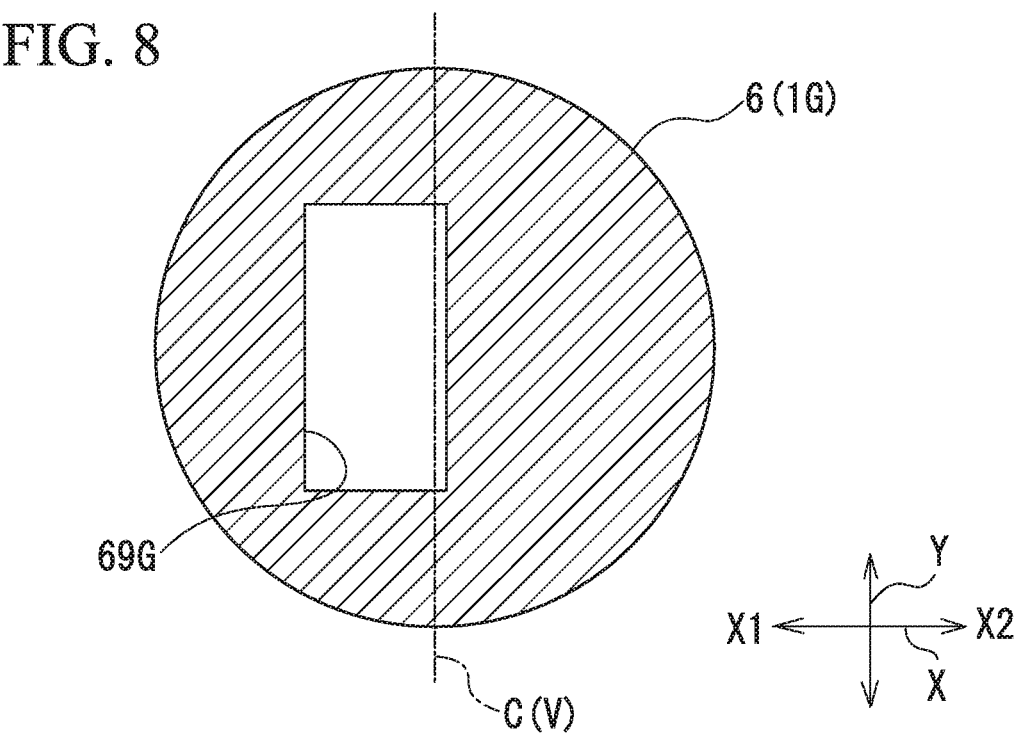
FIG. 8 is a view showing a configuration of a first modified example of the turbocharger in the third embodiment of the present invention, and is a cross-sectional view taken along a line indicated by arrows D3-D3 in FIG. 4.

FIG. 8 is a view showing a configuration of a first modified example of the turbocharger in the third embodiment of the present invention, and is a cross-sectional view taken along a line indicated by arrows D3-D3 in FIG. 4.

As shown in FIG. 8, an oil drainage port 69G which is offset to the upstream side X1 in the rotating direction R at the upper side of the rotating shaft 4 in the width direction X can be, for example, a rectangular shape (rectangular shape) in a cross-sectional view.

Second Modified Example of Third Embodiment

Figure 9:
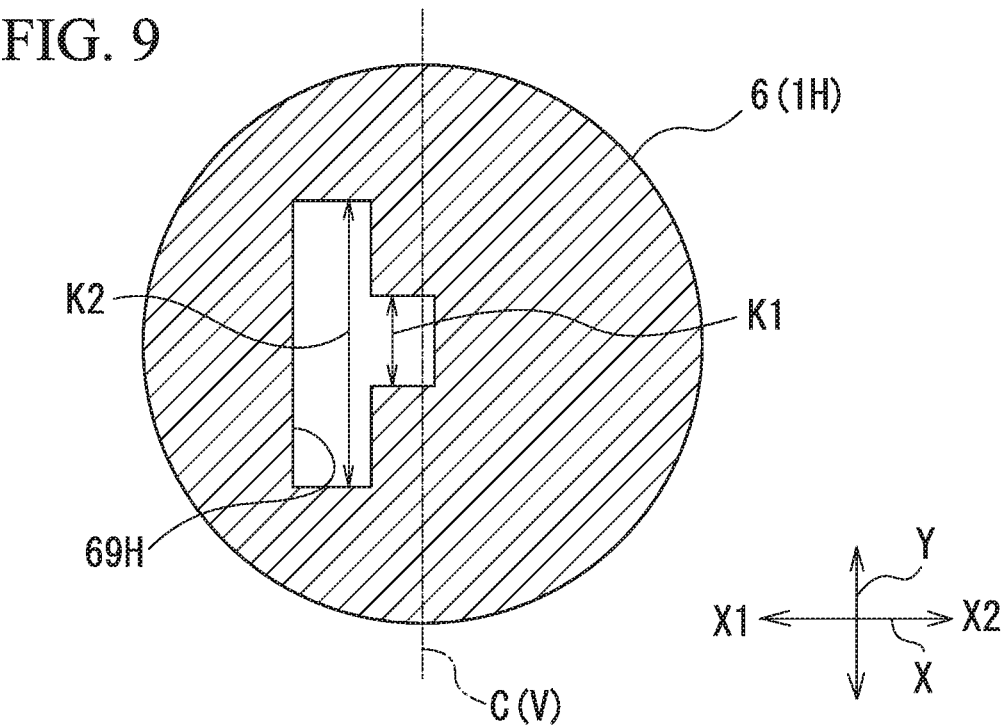
FIG. 9 is a view showing a configuration of a second modified example of the turbocharger in the third embodiment of the present invention, and is a cross-sectional view taken along a line indicated by arrows D3-D3 in FIG. 4.

FIG. 9 is a view showing a configuration of a second modified example of the turbocharger in the third embodiment of the present invention, and is a cross-sectional view taken along a line indicated by arrows D3-D3 in FIG. 4.

As shown in FIG. 9, an oil drainage port 69H may, for example, have a T-shaped cross section in which opening dimensions K1 and K2 in an axial direction Y increase in stages toward the upstream side X1 in the rotating direction R at an upper side of the rotating shaft 4 along the width direction X with respect to the central axis C of the rotating shaft 4.

As shown in FIG. 4, more of the lubricating oil flowing in via the inclined surface 68d from the downstream side X2 side in the rotating direction R of the discharge oil chamber 68 flows, due to its inertia, into the opening dimension K2 which is a larger portion on the upstream side X1 in the rotating direction R in the oil drainage port 69H shown in FIG. 9.

Since such opening dimensions K1 and K2 of the oil drainage port 69H increase in stages toward the upstream side X1 in the rotating direction R, the lubricating oil flowing in can be made to flow downward efficiently.

Third Modified Example of Third Embodiment

Figure 10:
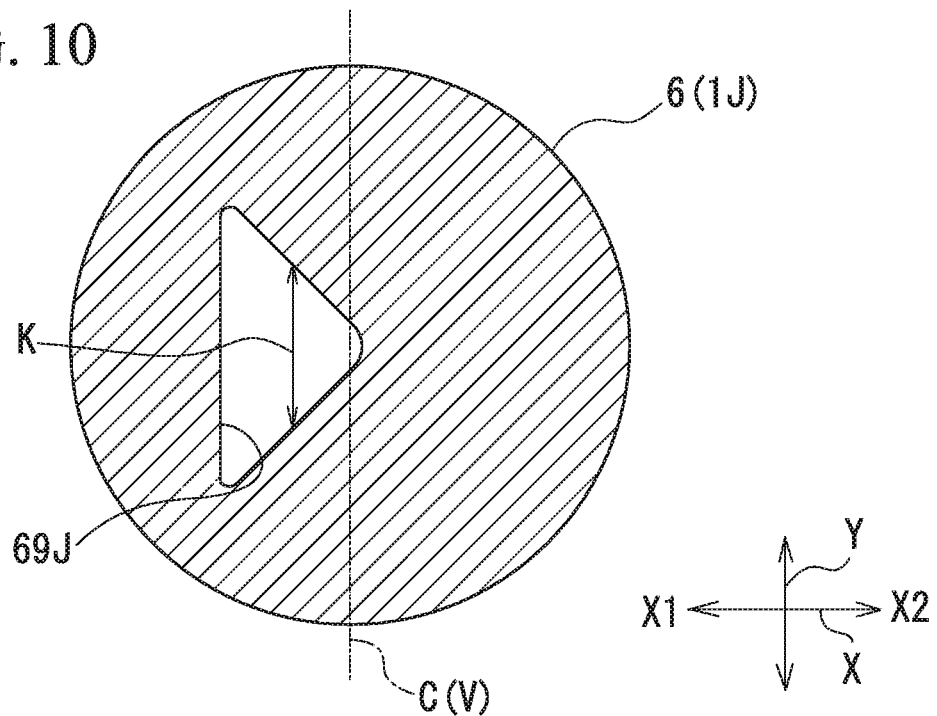
FIG. 10 is a view showing a configuration of a third modified example of the turbocharger in the third embodiment of the present invention, and is a cross-sectional view taken along a line indicated by arrows D3-D3 in FIG. 4.

FIG. 10 is a view showing a configuration of a third modified example of the turbocharger in the third embodiment of the present invention, and is a cross-sectional view taken along a line indicated by arrows D3-D3 in FIG. 4.

As shown in FIG. 10, an oil drainage port 69J may, for example, have a triangular shaped cross section in which an opening dimensions K in the axial direction Y gradually increases toward the upstream side X1 in the rotating direction R at an upper side of the rotating shaft 4 along the width direction X with respect to the central axis C of the rotating shaft 4.

More lubricating oil flowing in via the inclined surface 68d (see FIG. 4) from the downstream side X2 side in the rotating direction R of the discharge oil chamber 68 flows, due to its inertia, into a portion in which an opening dimension K on the upstream side X1 in the rotating direction R is larger at the oil drainage port 69H.

Since such an opening dimension K of the oil drainage port 69H gradually increases toward the upstream side X1 in the rotating direction R, the lubricating oil flowing in can be made to flow downward efficiently.

Fourth Embodiment

Next, a fourth embodiment of a turbocharger according to the present invention will be described. A turbocharger 1K shown in the fourth embodiment differs from the turbochargers 1C of the second embodiment only in a configuration of an oil drainage port 69K. Therefore, in the description of the fourth embodiment, portions the same as those in the first to third embodiments are denoted by the same reference signs, and duplicate description thereof will be omitted. That is, descriptions common to the overall configuration of the turbochargers 1A to 1J described in the first to third embodiments, will be omitted.

Figure 11:
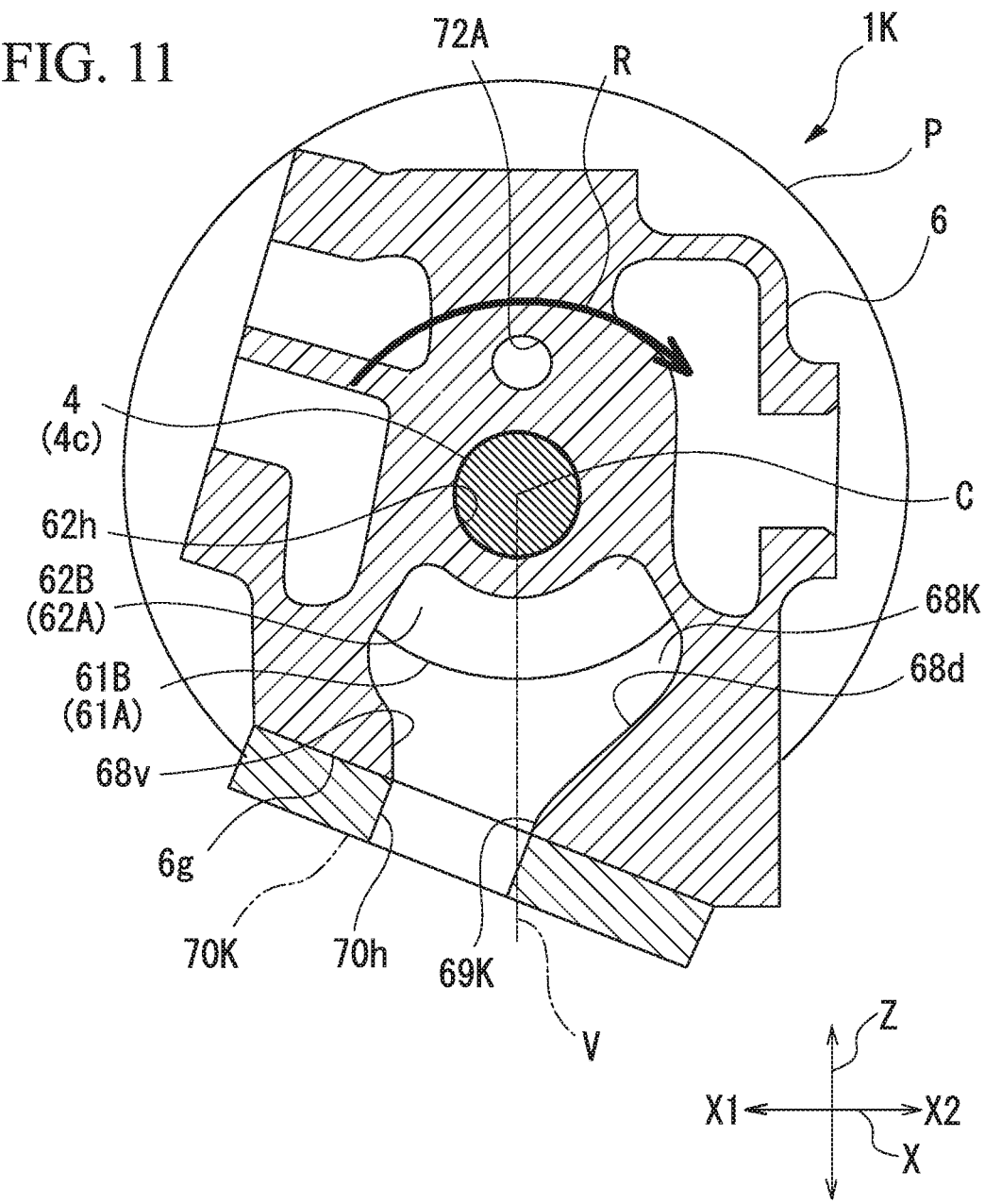
FIG. 11 is a view showing a configuration of a turbocharger in a fourth embodiment of the present invention, and is a cross-sectional view taken along a line indicated by arrows D2-D2 in FIG. 1.

FIG. 11 is a view showing a configuration of a turbocharger in a fourth embodiment of the present invention, and is a cross-sectional view taken along a line indicated by arrows D2-D2 in FIG. 1.

As shown in FIG. 11, the oil drainage port 69K formed below a discharge oil chamber 68K of a housing 6 of the turbocharger 1K is asymmetrically formed with a vertical plane V including a central axis C of a rotating shaft 4 as a boundary plane in a width direction X.

In this embodiment, the oil drainage port 69K is formed to be inclined downward from the discharge oil chamber 68K side thereabove, from the downstream side X2 to the upstream side X1 in a rotating direction R at an upper side of the rotating shaft 4 in the width direction X.

As in the second embodiment described above, in the discharge oil chamber 68K, a bottom surface on the downstream side X2 in the rotating direction R at the upper side of the rotating shaft 4 in the width direction X is an inclined surface 68d gradually inclined downward toward the oil drainage port 69K.

In addition, in the discharge oil chamber 68K, a vertical surface 68v extending in a vertical direction Z is formed at a portion facing the inclined surface 68d on the upstream side X1 in the rotating direction R at the upper side of the rotating shaft 4.

In such a configuration, it is preferable to form an oil drainage hole 70h which is inclined to be continuous with the oil drainage port 69K in a flange 70K provided on an outer peripheral surface 6g at a lowermost portion of a housing 6.

With such a configuration, since the oil drainage port 69K inclined downward in the same direction as the inclined surface 68d is formed to be continuous with the inclined surface 68d at a bottom portion of the discharge oil chamber 68K, the lubricating oil flows down quickly to the oil drainage port 69K thereunder.

Since the vertical surface 68v is formed at a portion facing the inclined surface 68d in the width direction X, the vertical surface 68v can receive the lubricating oil bounced off the inclined surface 68d and lead it to the oil drainage port 69K thereunder.

In the turbocharger 1K of this embodiment, the oil drainage port 69K is inclined downward from above from the downstream side X2 in the rotating direction R of the rotating shaft 4 to the upstream side X1. Thereby, the lubricating oil bounced to the downstream side X2 in the rotating direction R of the rotating shaft 4 can be made to flow smoothly from the inclined surface 68d to the oil drainage port 69K. As a result, it is possible to enhance a discharge performance of the lubricating oil.

Thereby, it is possible to inhibit an increase in agitation loss of the rotating shaft 4. As a result, mechanical loss of the turbocharger 1K can be inhibited.

Modified Example of Fourth Embodiment

In the fourth embodiment described above, although the oil drainage hole 70h that is inclined to be continuous with the oil drainage port 69K is configured to be provided in the flange 70K, the present invention is not limited thereto.

Figure 12:
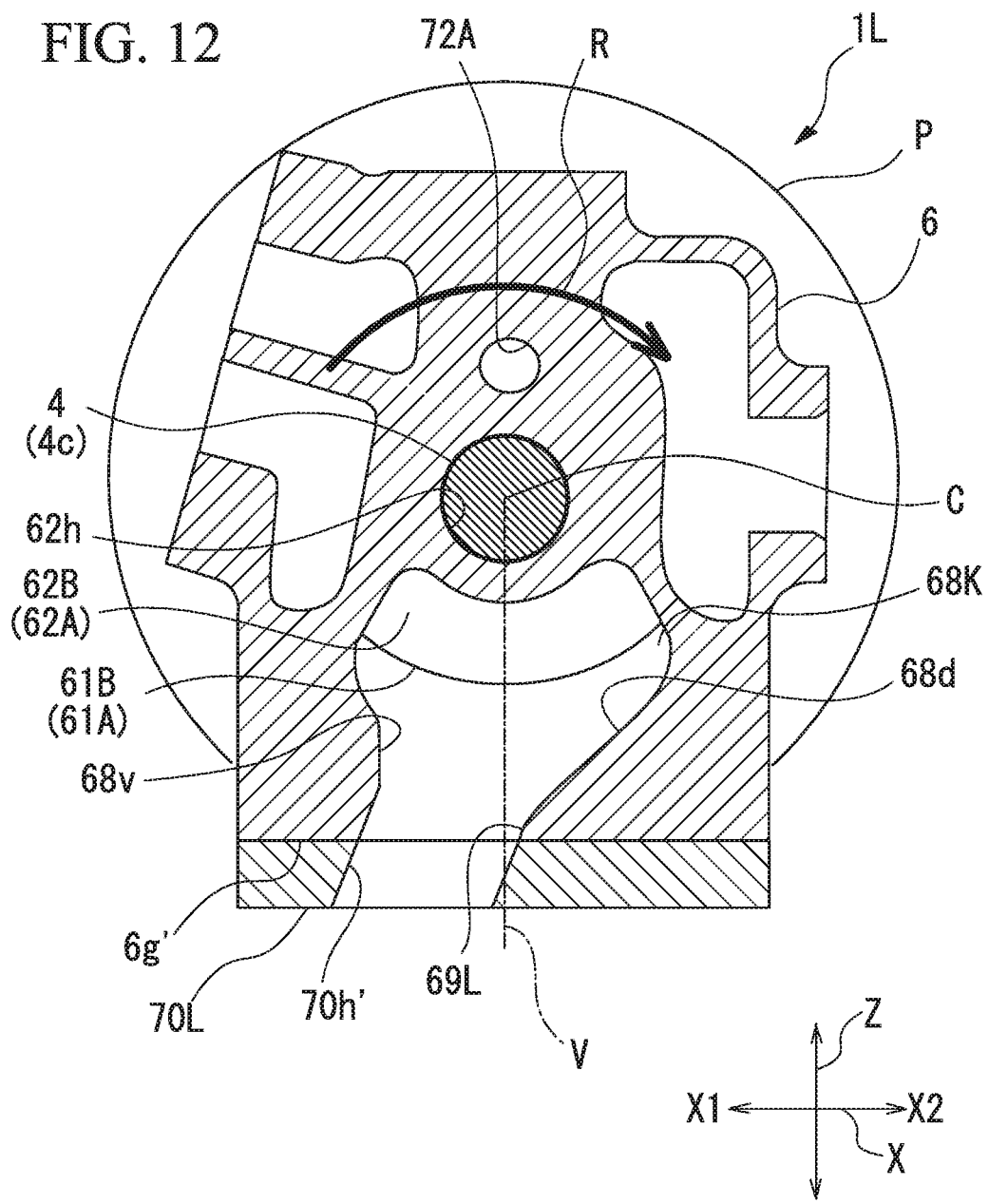
FIG. 12 is a view showing a configuration of a modified example of the turbocharger in the fourth embodiment of the present invention, and is a cross-sectional view taken along a line indicated by arrows D2-D2 in FIG. 1.

FIG. 12 is a view showing a configuration of a modified example of the turbocharger in the fourth embodiment of the present invention, and is a cross-sectional view taken along a line indicated by arrows D2-D2 in FIG. 1.

As shown in FIG. 12, an oil drainage port 69L formed below a housing 6 of a turbocharger 1L is formed to be inclined downward from the discharge oil chamber 68K thereabove from the downstream side X2 to the upstream side X1 in a rotating direction R on an upper side of a rotating shaft 4 in a width direction X.

In this turbocharger 1L, an outer peripheral surface 6g' at a lowermost portion of the housing 6 is formed to be perpendicular to an inclination direction of the oil drainage port 69L.

In such a configuration, it is preferable to form an oil drainage hole 70h' inclined to be continuous with the oil drainage port 69L in the flange 70L provided on the outer peripheral surface 6g'.

Also in such a configuration, the oil drainage port 69L is inclined downward from above from the downstream side X2 to the upstream side X1 in the rotating direction R of the rotating shaft 4. Thereby, the lubricating oil bounced to the downstream side X2 in the rotating direction R of the rotating shaft 4 can be made to flow smoothly from the inclined surface 68*d* to the oil drainage port 69K. As a result, it is possible to enhance a discharge performance of the lubricating oil.

Thereby, it is possible to inhibit an increase in agitation loss of the rotating shaft 4. As a result, mechanical loss of the turbocharger 1L can be inhibited.

Fifth Embodiment

Next, a fifth embodiment of a turbocharger according to the present invention will be described. The turbocharger to be described in the fifth embodiment is a turbocharger in which an entrainment-inhibiting portion for inhibiting entrainment of lubricating oil is provided with respect to the turbocharger 1A of the first to fourth embodiments. Therefore, in the description of the fifth embodiment, portions the same as those in the first to fourth embodiments are denoted by the same reference signs, and duplicate description thereof will be omitted. That is, descriptions common to the overall configuration of the turbochargers 1A to 1L described in the first to fourth embodiments, will be omitted.

Figure 13:
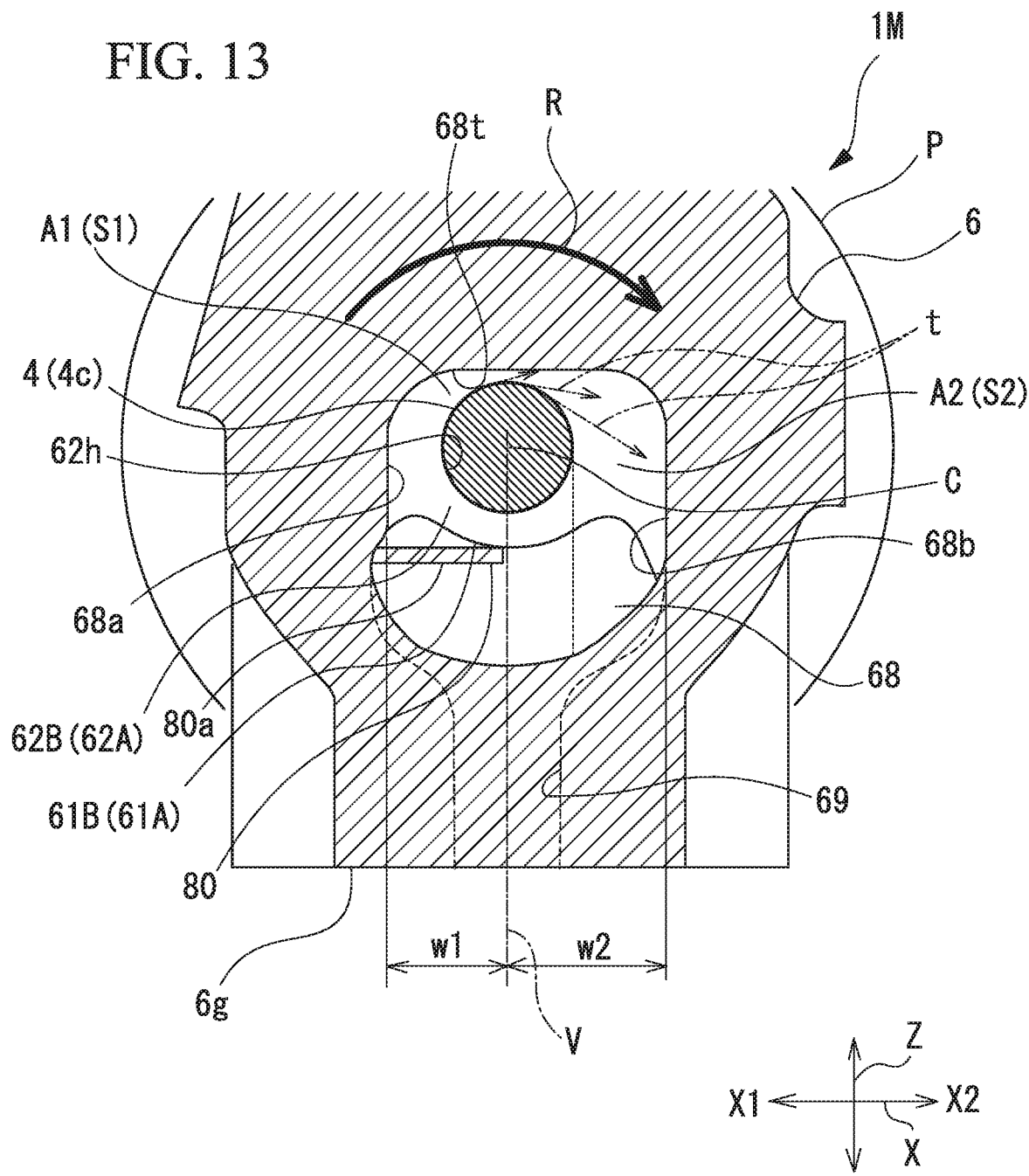
FIG. 13 is a cross-sectional view in a fifth embodiment of the present invention corresponding to FIG. 2.

FIG. 13 is a cross-sectional view in the fifth embodiment of the present invention corresponding to FIG. 2.

As shown in FIG. 13, the turbocharger 1M in this embodiment includes an entrainment-inhibiting portion 80. The entrainment-inhibiting portion 80 inhibits lubricating oil present below a rotating shaft 4 from being introduced into the rotating shaft 4 by entrainment due to the rotating shaft 4 or by being bounced off an inner wall surface.

The entrainment-inhibiting portion 80 in an example of this embodiment is disposed on a downstream side of a vertical plane V below the rotating shaft 4 close to the rotating shaft 4. The entrainment-inhibiting portion 80 extends in a direction intersecting the vertical plane V and has a lower surface 80*a* extending from a side wall surface 68*a* to the vicinity of the vertical plane V.

Therefore, according to the fifth embodiment, the lubricating oil present below the rotating shaft 4 that is entrained by the rotating shaft 4 or bounced off the side wall surface 68*a* can be inhibited from moving upward again by the entrainment-inhibiting portion 80. That is, the lubricating oil can be discharged smoothly.

Although the case in which the entrainment-inhibiting portion 80 is formed in a flat plate shape is taken as an example in the fifth embodiment, the present invention is not limited to a flat plate shape as long as it can inhibit entrainment and bouncing-off of the lubricating oil. Further, although the case in which the entrainment-inhibiting portion 80 protrudes to the vicinity of the vertical plane V has been described, an amount of the protrusion of the entrainment-inhibiting portion 80 may be appropriately set. Further, although the case in which the entrainment-inhibiting portion 80 extends horizontally is taken as an example, it may be inclined with respect to the horizontal.

Other Embodiments

The present invention is not limited to the above-described embodiments and modified examples thereof, and modifications can be made in design without departing from the gist of the present invention.

For example, the configuration of each portion of the turbochargers 1A to 1L can be modified to an appropriate configuration other than the above, for example, by employing a ball bearing instead of the journal bearings 5A and 5B.

For example, in the above-described embodiments, the case in which both the discharge oil chamber and the oil drainage port are formed to be asymmetric between the first region and the second region which are defined by the vertical plane including the central axis C of the rotating shaft 4 as a boundary plane has been described. However, the discharge oil chamber 68 of the discharge oil chamber 68 and the oil drainage port 69 need only be asymmetrically formed between the first region and the second region defined by the vertical plane including the central axis C of the rotating shaft 4 as a boundary plane. That is, the discharge oil chamber 68 need only be asymmetrically formed between the first region and the second region defined by the vertical plane including the central axis C of the rotating shaft 4 as a boundary plane.

Further, the configurations shown in the embodiments and the modified examples described above can be appropriately combined.

INDUSTRIAL APPLICABILITY

Since at least one of the discharge oil chamber and the oil drainage port formed in the housing is formed to be asymmetric between the first region and the second region defined by the vertical plane including an axis of the rotating shaft as a boundary plane, and thus agitation loss of the rotating member due to lubricating oil in the housing is inhibited, mechanical loss of the turbocharger can be inhibited.

REFERENCE SIGNS LIST

1A to 1M Turbocharger
2 Turbine wheel
3 Compressor wheel
4 Rotating shaft
4*a* First end portion
4*b* Second end portion
4*c* Central portion
4*d* Large diameter portion
4*n* Threaded portion
5A, 5B Journal bearing (bearing)
5*m* Communication hole
5*s* Sliding surface
6 Housing
6*f* Outer peripheral surface
6*g* Outer peripheral surface
31 Nut
41 Plate
42 Oil ring
43 Thrust sleeve
44 Thrust ring
46 Seal ring
60*a* Opening
60*b* Opening
61A, 61B Bearing accommodating portion
61C End portion
61D End portion
63 Snap ring
64 Pressing member
64*a* Through hole
64*b* Circumferential wall portion
65 Thrust bearing
66, 67 Gap
68, 68B, 68C, 68D, 68K Discharge oil chamber
68*a*, 68*b* Side wall surface
68*d* Inclined surface
68*t*, 68*ta*, 68*tb* Upper surface
68*v* Vertical surface
69 Oil drainage port 69C, 69D, 69E, 69F, 69G, 69H, 69J, 69K, 69L Oil drainage port
70, 70K, 70L Flange
70h Oil drainage hole
71 Oil supply pipe connection port
72A, 72B Supply flow path
73 Guide member
80 Entrainment-inhibiting portion
A1 Region
A2 Region
A11 Region
A12 Region
C Central region (axis)
h1, h2 Distance
K, K1, K2 Opening dimension
P Compressor
R Rotating direction
S1, S2, S11, S12 Cross-sectional area
t Tangential direction
T Turbine
V Vertical plane
w, w1, w2 Distance
X Width direction
X1 Upstream side in rotating direction of rotating shaft at upper side of rotating shaft (first region)
X2 Downstream side in rotating direction of rotating shaft at upper side of rotating shaft (second region)
Y Axial direction
Z Vertical direction

The invention claimed is:

1. A turbocharger comprising:
a rotating shaft extending along an axis;
a turbine wheel provided at a first end portion of the rotating shaft;
a compressor wheel provided at a second end portion of the rotating shaft;
a housing accommodating at least a portion of the rotating shaft in a longitudinal direction along the axis;
bearings provided in the housing and configured to support the rotating shaft to be rotatable around the axis;
a supply flow path supplying lubricating oil to each of the bearings;
a discharge oil chamber formed in the housing and to which the lubricating oil is discharged from the bearings; and
an oil drainage port formed below the discharge oil chamber and configured to discharge the lubricating oil to the outside of the housing, wherein
the discharge oil chamber is formed to be asymmetric between a first region and a second region defined by a vertical plane including the axis of the rotating shaft as a boundary plane,
in an upper side of the rotating shaft in the discharge oil chamber, the distance of an upper surface on a downstream side in a rotating direction of the rotating shaft from the axis is larger than the distance of an upper surface on an upstream side in the rotating direction of the rotating shaft from the axis,
in the discharge oil chamber, a distance in the width direction from the axis to a side wall surface on the first side and to a side wall surface on the second side is the same, and
at the upper end of the rotating shaft, a cross-sectional area of the discharge oil chamber on the downstream side in the rotating direction of the rotating shaft is larger than a cross-sectional area of the discharge oil chamber on the upstream side in the rotating direction.

2. The turbocharger according to claim 1, wherein the oil drainage port is formed to be asymmetric between the first region and the second region defined by the vertical plane including the axis of the rotating shaft as a boundary plane.

3. The turbocharger according to claim 1, wherein the oil drainage port is provided to be offset to the downstream side in the rotating direction of the rotating shaft with respect to the vertical plane.

4. The turbocharger according to claim 1, wherein an inclined surface inclined downward from above from the upstream side in the rotating direction of the rotating shaft to the downstream side is provided below the discharge oil chamber on the downstream side in the rotating direction of the rotating shaft.

5. The turbocharger according to claim 4, wherein a vertical surface having an inclination angle smaller than that of the inclined surface is formed below the discharge oil chamber at a portion facing the inclined surface on the upstream side in the rotating direction of the rotating shaft.

6. The turbocharger according to claim 4, wherein the oil drainage port is formed to be continuous with a lower side of the inclined surface and is provided to be offset to the upstream side in the rotating direction at an upper side of the rotating shaft with respect to the vertical plane.

7. The turbocharger according to claim 4, wherein the oil drainage port is inclined downward from above from the upstream side in the rotating direction of the rotating shaft to the downstream side.

8. The turbocharger according to claim 1, wherein a cross-sectional shape of the oil drainage port intersecting the vertical plane is an elliptical shape which is long along the vertical plane.

9. The turbocharger according to claim 1, wherein a cross-sectional shape of the oil drainage port intersecting the vertical plane is a rectangular shape which is long along the vertical plane.

10. The turbocharger according to claim 1, wherein a cross-sectional shape of the oil drainage port intersecting the vertical plane is a T shape in which a dimension in an axial direction increases in stages toward the downstream side.

11. The turbocharger according to claim 1, wherein a cross-sectional shape of the oil drainage port intersecting the vertical plane is a triangle shape in which a dimension in an axial direction increases gradually toward the downstream side.

12. The turbocharger according to claim 1, wherein an entrainment-inhibiting portion configured to inhibit entrainment of lubricating oil is provided in the discharge oil chamber.

* * * * *